United States Patent
Shabtay et al.

(10) Patent No.: US 7,924,837 B1
(45) Date of Patent: Apr. 12, 2011

(54) IP MULTICAST IN VLAN ENVIRONMENT (75) Inventors: Lior Shabtay, Ganei Tikva (IL); Benny Rodrig, Lexington, MA (US)

(73) Assignee: Avaya Communication Israel Ltd., Tel Aviv (IL)

( * ) Notice: Subject to any disclaimer, the term of this patent is extended or adjusted under 35 U.S.C. 154(b) by 2579 days.

(21) Appl. No.: 09/629,219

(22) Filed: Jul. 31, 2000

(51) Int. Cl.
*H04L 12/56* (2006.01)

(52) U.S. Cl. .................. 370/392; 370/235; 370/465

(58) Field of Classification Search .......... 370/255, 370/257, 351, 352, 354, 356, 389, 390, 392, 370/395.53, 395.54, 400, 401, 432, 466, 370/230, 230.1, 235, 395.31, 465; 709/230, 709/238, 239, 242, 249

See application file for complete search history.

(56) References Cited

U.S. PATENT DOCUMENTS

| 5,394,402 | A | * | 2/1995 | Ross ............................ 370/402 |
| 5,490,252 | A | * | 2/1996 | Macera et al. ................ 709/249 |
| 5,506,838 | A | * | 4/1996 | Flanagan ..................... 370/258 |
| 5,550,816 | A | * | 8/1996 | Hardwick et al. ............ 370/397 |
| 5,684,800 | A | * | 11/1997 | Dobbins et al. .............. 370/401 |
| 5,742,604 | A | * | 4/1998 | Edsall et al. ................. 370/401 |
| 5,796,732 | A | * | 8/1998 | Mazzola et al. .............. 370/362 |
| 5,898,686 | A | * | 4/1999 | Virgile ......................... 370/381 |
| 5,920,566 | A | * | 7/1999 | Hendel et al. ................ 370/401 |
| 5,959,989 | A | * | 9/1999 | Gleeson et al. .............. 370/390 |
| 5,963,556 | A | * | 10/1999 | Varghese et al. ............. 370/401 |
| 6,014,380 | A | * | 1/2000 | Hendel et al. ................ 370/392 |
| 6,081,522 | A | * | 6/2000 | Hendel et al. ................ 370/389 |
| 6,088,356 | A | * | 7/2000 | Hendel et al. ................ 370/392 |
| 6,104,695 | A | * | 8/2000 | Wesley et al. ................ 370/216 |
| 6,181,681 | B1 | * | 1/2001 | Hiscock et al. .............. 370/279 |
| 6,262,982 | B1 | * | 7/2001 | Donahue et al. ............. 370/352 |
| 6,370,142 | B1 | * | 4/2002 | Pitcher et al. ................ 370/390 |
| 6,553,028 | B1 | * | 4/2003 | Tang et al. ................... 370/389 |
| 6,570,875 | B1 | * | 5/2003 | Hegde .......................... 370/389 |
| 6,614,787 | B1 | * | 9/2003 | Jain et al. ..................... 370/390 |
| 6,625,658 | B1 | * | 9/2003 | Oguchi et al. ............... 709/238 |

OTHER PUBLICATIONS

Fenner, W.; "Internet Group Management Protocol, Version 2"; RFC 2236; IETF 1997.
Pusateri, T.; "Distance Vector Multicast Routing Protocol"; Internet Draft; draft-ietf-idmr-dvmrp-v3-09.txt; IETF Sep. 1999.
Waitzman, D. et al.; "Distance Vector Multicast Routing Protocol"; RFC 1075; Stanford University; Nov. 1998.
Fenner, B. et al.; "Protocol Independent Multicast—Sparse Mode (PIM-SM): Protocol Specification (Revised)"; Internet draft; draft-ietf-pim-sm-v2-new-00.txt; IETF Jul. 2000.
Deering, S. et al.; "Protocol Independent Multicast version 2 Dense Mode Specification"; Internet draft; draft-ietf-idmr-pim-dm-06.txt; IETF Aug. 1997.
"Draft Standard P802.IQ/D9, IEEE Standards for Local and Metropolitan Area Networks: Virtual Bridged Local Area Networks"; P802.IQ/D9, Feb. 1998.

(Continued)

*Primary Examiner* — Donald Mills
(74) *Attorney, Agent, or Firm* — Joseph B. Ryan; Jason Paul DeMont; Wayne S. Breyer (57) ABSTRACT

A method of determining local multicast information of a local area network (LAN), comprising dividing the LAN to a number of segments larger than the number of virtual LANs (VLANs) in the network and creating a layer-3 multicast routing table, which relates to each of the segments separately.

8 Claims, 6 Drawing Sheets

OTHER PUBLICATIONS

"Multicast Routing Domains and Multicast Host Membership Domains"; Network Design Considerations for Multicast IP Deployment; http://www.3com/technology/tech_net/white_papers/503050a.html.

* cited by examiner

IP MULTICAST IN VLAN ENVIRONMENT

FIELD OF THE INVENTION

The present invention relates to communication networks and in particular to IP multicast in local area networks.

BACKGROUND OF THE INVENTION

Many Internet applications include transmission of large amounts of data from a single source to a plurality of destinations. These applications include, for example, video and audio conferencing and replicating databases and web sites. Using unicast transmission, such applications send a copy of each packet they generate to each of the subscribers separately. IP multicast allows transmission of the packets in a more bandwidth efficient manner. IP multicast may also be used in many-to-many transmission applications, such as in conference calls and distributed database applications.

In the IP multicast scheme, a source transmits multicast packets which carry a destination IP address which identifies the multicast group to which the packets belong. Routers which receive the multicast packets, generally transfer a single copy of the packet in each direction in which subscribers are currently situated.

An Internet group management protocol (IGMP) is used to keep the routers updated, for each layer-2 network to which the routers are connected, with the current multicast addresses for which at least one of the hosts of the layer-2 network is a subscriber. In each layer-2 network, a single router, generally with the lowest IP address, is selected as a querier which periodically sends query packets asking the hosts of the network to report the multicast groups from which they wish to receive packets. The routers connected to the layer-2 network keep track for each multicast address if any of the hosts of the layer-2 network is interested in receiving the packets of the multicast address. The IGMP protocol is described, for example, in W. Fenner, "Internet Group Management Protocol, Version 2", RFC 2236, IETF 1997, the disclosure of which is incorporated herein by reference.

In addition, an IP multicast routing protocol is used to choose a distribution tree through which the multicast packets are delivered to the subscribers. The multicast protocol governs the behavior of the router upon receiving a multicast packet. This behavior includes determination of the interfaces through which the packet is forwarded, if at all. Generally, the multicast routing protocols select, for each layer-2 network, one router to be a representative router which will deliver the multicast packets to the subscribers of the layer-2 network. Generally, the selection is performed separately for each packet source of each multicast group. The packets of a specific multicast group from a specific source are referred to herein as belonging to a specific source group.

Some multicast routing protocols, e.g., distance vector multicast routing protocol (DVMRP), multicast open shortest path first (MOSPF) and protocol-independent multicast-dense mode (PIM-DM), assume that the subscribers are densely distributed throughout the network and that bandwidth is plentiful and accordingly use a broadcast and prune scheme. Other multicast routing protocols, e.g., core based trees (CBT) and protocol-independent multicast-sparse mode (PIM-SM), assume that the subscribers are sparsely distributed throughout the network and therefore use a registration scheme. Some of these protocols are described, for example, in D. Waitzman, et al., "Distance Vector Multicast Routing Protocol", RFC 1075, IETF 1988; B. Fenner, et al., "Protocol Independent Multicast—Sparse Mode (PIM-SM): Protocol Specification (Revised)", Internet draft, draft-ietf-pim-sm-v2-new-00, IETF, July 2000 and S. Deering, et al., "Protocol Independent Multicast Version 2 Dense Mode Specification", Internet draft, draft-ietf-idmr-pini-dm-06.txt, IETF, Aug. 6, 1997, the disclosures of which documents are incorporated herein by reference.

Within each layer-2 network, a local process is used to deliver the multicast packets to the subscriber hosts, preferably without passing the multicast packets to non-subscriber hosts. To achieve this task, some switches have multicast filtering units which determine through which physical ports they should forward multicast packets. A method for performing multicast filtering is described, for example, in "Multicast Routing Domains and Multicast Host Membership Domains" a 3COM Technology paper available at //www.3com.com/technology/tech_net/white_papers/503050a.html, the disclosure of which is incorporated herein by reference.

Two major forwarding methods are used in packet based networks. Within layer-2 networks, packets are generally forwarded in layer-2 in a process referred to as bridging. The bridging in layer-2 is performed based on MAC addresses carried in a frame header attached to the packets. Between layer-2 networks, packets are forwarded in layer-3 in a process referred to as routing. The layer-3 routing is performed based on IP addresses carried in IP headers of the packets. Generally, the routing includes changing the source and/or destination MAC (layer-2) address of the frame including the packet. The packets generally include a time to live (TTL) field which indicates the maximal number of routers the packet may pass through. Each router which routes a packet usually reduces its TTL by one. Packets with a TTL of 1 or 0 are not routed, in order to prevent packets which entered infinite loops from eternally being forwarded. The bridging is generally performed by layer-2 switches and the routing is generally performed by routers. Layer-3 switches are switches which perform both layer-2 bridging and layer-3 routing. In order to support efficient multicast handling, layer-3 switches may include both multicast routing and multicast filtering capabilities. This adds to the complexity of layer-3 switches.

Many modern layer-2 and layer-3 switches support a feature called virtual local area networks (VLANs), which allows a single physical LAN to operate as though it were a plurality of LANs. Generally, packets entering physical LANs which support VLANs are tagged with a VLAN ID indicating the VLAN in which the packets are currently being forwarded. Packets having a specific VLAN ID are forwarded only through switch ports which support that VLAN. In order to forward packets between hosts belonging to different VLANs of the same physical LAN, the packets must be forwarded to a layer-3 switch (or a router) for routing (which includes changing the VLAN ID of the packets), although the source and destination computer are both located on the same physical layer-2 network infrastructure. An emerging standard for VLANs is described in "Draft Standard P802.1Q/D9, IEEE Standards for Local and Metropolitan Area Networks: Virtual Bridged Local Area Networks", 1998, the disclosure of which is incorporated herein by reference.

Since the switches of a network consider the different VLANs as different LANs, IP multicast packets are distributed throughout the different VLANs independently of each other. This may cause bandwidth waste as illustrated in FIG. 1.

Figure 1:
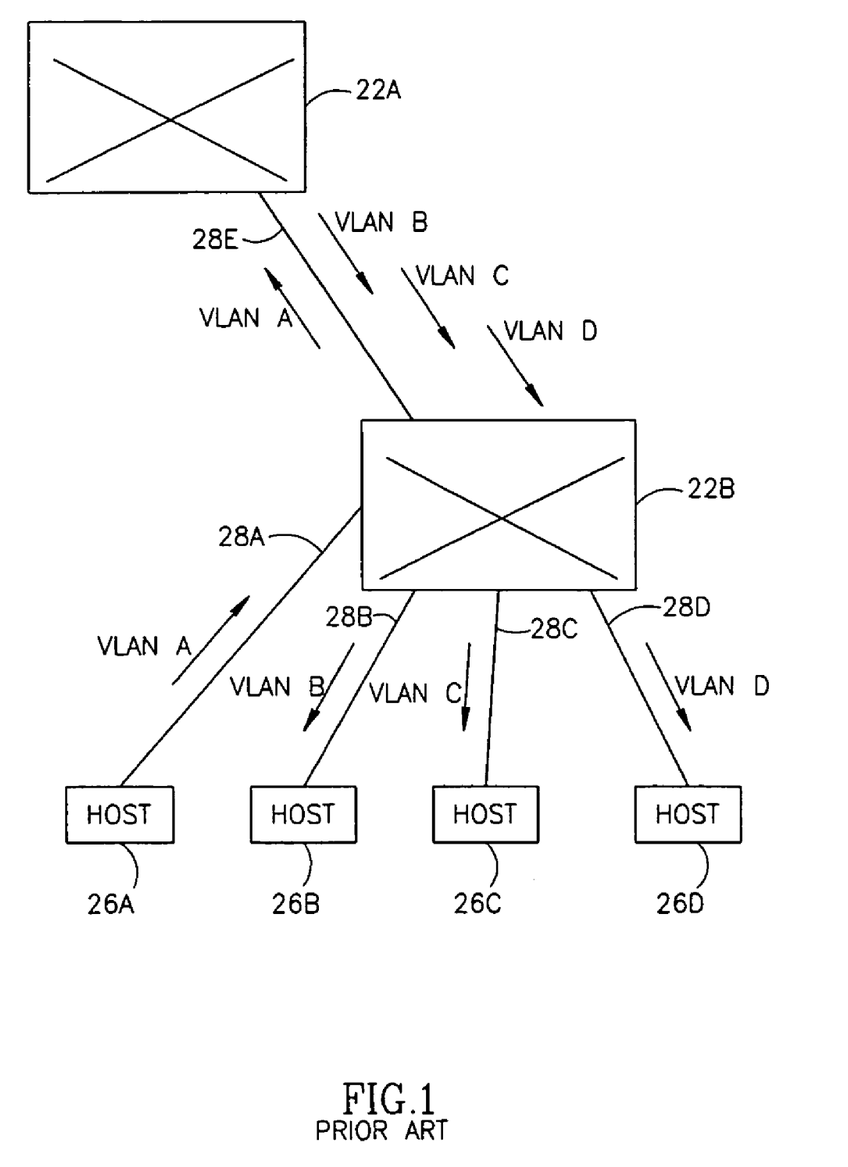
FIG. 1 is a schematic diagram of a network which illustrates a process of forwarding multicast packets known in the art.

FIG. 1 is a schematic diagram of a network 20, illustrating a process of forwarding multicast packets known in the art. Network 20 includes two layer 3 switches 22A and 22B. It is assumed that switch 22A has a lower IP address and therefore is selected to route multicast packets between the VLANs of network 20. A link 28E connects switches 22A and 22B. A host 26A serves as a source for a specific multicast group and transmits multicast packets on a VLAN A. Hosts 26B, 26C and 26D, connected on VLANs B, C and D, through links 28B, 28C and 28D, respectively, are subscribers. The multicast packets pass in VLAN A along links 28A and 28E to switch 22A in which they pass routing to VLANs B, C and D. Three copies of each packet pass on link 28E, back to switch 22B, for each of VLANs B, C and D. The packets are then distributed by switch 22B to hosts 26B, 26C and 26D. This distribution of multicast packets is very wasteful in bandwidth.

It is noted that in sending unicast packets, for example from host 26A to host 26B, the packets are routed by a switch selected by host 26A according to its unicast table.

SUMMARY OF THE INVENTION

An aspect of some embodiments of the present invention relates to routing IP multicast packets to subscribers in a single VLAN by a plurality of layer-3 switches. In some embodiments of the invention, all layer-3 switches of a local area network (LAN) route IP multicast packets, regardless of whether they are the representative router of the LAN for the multicast packets in the multicast routing protocol used.

An aspect of some embodiments of the invention relates to performing IP multicast protocols (e.g., IGMP, PIM-DM) separately for sub-portions of LANs or of VLANs, referred to herein as VLAN segments, (in most cases, each VLAN includes a plurality of segments) rather than for an entire LAN (or VLAN). In some embodiments of the invention, some or all of the layer-3 switches of a network forward control packets of IP multicast protocols (and optionally IP multicast data packets) throughout VLAN segments rather than throughout entire VLANs. The layer-3 switches which relate to VLAN segments as described above are referred to herein as new layer-3 switches. By reducing the size of layer-2 network portions for IP multicast routing purposes, from entire VLANs to VLAN segments, the length over which multicast packets may be unnecessarily forwarded is reduced to the length of the segments.

In some embodiments of the invention, each portion of a network which is bordered by new layer-3 switches is considered a separate VLAN segment, for each of the VLANs passing on the network portion. Thus, each layer-3 switch of the present invention performs IP multicast routing of packets it receives and IP multicast packets are not bridged unnecessarily to other layer-3 switches for routing.

In other embodiments of the invention, in each VLAN, a single backbone segment includes a tree of the paths which connect the layer-3 switches of the VLAN. Each path between a layer-3 switch and a host which is not included in the backbone segment is considered a separate VLAN segment. Although in these embodiments some multicast packets may be bridged unnecessarily, these embodiments are more compatible to various multicast routing protocols and are generally easier to implement.

There is therefore provided in accordance with an embodiment of the present invention, a method of determining local multicast information of a local area network (LAN), comprising dividing the LAN to a number of segments larger than the number of virtual LANs (VLANs) in the network, and creating a layer-3 multicast routing table, which relates to each of the segments separately. Optionally, the layer-3 multicast routing table lists in each of its entries the segments to which matching packets should be routed. In some embodiments of the invention, the layer-3 multicast routing table identifies interfaces according to a VLAN and a port. In some embodiments, the layer-3 multicast routing table lists for substantially each entry a legal interface which is identified by a VLAN and a port.

In some embodiments of the invention, dividing the LAN to a plurality of segments comprises dividing such that at least some of the segments are physically distinct. Optionally, dividing the LAN to a plurality of segments comprises dividing at least one of the VLANs of the LAN to a plurality of segments. In some embodiments, dividing the LAN to a plurality of segments comprises dividing such that each group of one or more links which connects two or more hosts, routers or layer-3 switches is a separate segment for each of the VLANs which pass on the group of links. Alternatively or additionally, dividing the LAN to a plurality of segments comprises dividing such that, for each VLAN, a backbone segment is defined as including all the groups of one or more links which connect two or more routers or layer-3 switches in the VLAN. Optionally, the links not included in the backbone segment for each VLAN are divided to separate segments in each VLAN, each segment including a group of one or more links which connect one or more hosts to a router or layer-3 switch.

In some embodiments, managing multicast related information for each of the segments separately comprises determining for each segment separately whether multicast packets should be routed to the segment. In some embodiments, managing multicast related information for each of the segments separately comprises performing the IGMP protocol in each of the segments separately. In some embodiments, the layer-3 switches of the LAN do not forward IP multicast routing related packets in layer-2. Alternatively or additionally, the layer-3 switches of the LAN do not perform multicast filtering in layer-2.

There is further provided in accordance with an embodiment of the present invention, a method of forwarding multicast packets by a layer-3 switch, comprising receiving a multicast packet by the switch through a first physical port on a first VLAN, and routing the multicast packet in layer-3 out a second physical port of the switch, on the first VLAN.

In some embodiments, routing the multicast packet comprises reducing the time to live (TTL) value of the packet. In some embodiments, the second physical port leads to at least one layer-3 switch or router. In some embodiments, the multicast packet is not bridged in layer-2 through the second physical port. Optionally, the multicast packet is bridged in layer-2 through a third physical port of the layer-3 switch. Alternatively, the multicast packet is not bridged in layer-2 through any of the physical ports of the switch.

There is further provided in accordance with an embodiment of the present invention, a method of forwarding multicast packets within a single VLAN, comprising receiving the multicast packets by a first switch connected to the VLAN, routing the multicast packets in layer-3 to a second switch connected to the VLAN, and routing the multicast packets in layer-3 by the second switch through an interface included in the VLAN.

In some embodiments, routing the multicast packets in layer-3 by the second switch comprises routing to a host and/or to a third switch connected to the VLAN.

There is further provided in accordance with an embodiment of the present invention, a method of forwarding multicast packets within a single VLAN, comprising receiving multicast packets of a specific destination address and source address by a first switch connected to the VLAN, routing the received multicast packets in layer-3, by the first switch, to at least one first host connected to the VLAN, receiving multicast packets of the specific destination address and source address by a second switch connected to the VLAN, and routing the multicast packets in layer-3, by the second switch, to at least one second host.

In some embodiments, the first switch is directly connected to the at least one first host. In some embodiments the method includes routing the multicast packets from the first switch to the second switch.

There is further provided in accordance with an embodiment of the present invention, a switch, comprising a plurality of ports, a layer-2 bridging unit which bridges packets between the ports responsive to their destination MAC address and their VLAN, and a multicast detector which identifies a group of at least some of the IP multicast routing related packets received by the switch, the group including IGMP queries, and prevents the layer-2 bridging unit from bridging the identified packets at least through ports which do not lead to at least one neighboring layer-3 switch or router. In some embodiments, the multicast detector prevents the layer-2 bridging unit from bridging the identified packets through any of the ports of the switch. Alternatively, the layer-2 bridging unit bridges at least some of the identified packets through a plurality of ports. In some embodiments, the multicast detector allows bridging in layer-2 of at least some of the identified packets, through one or more ports which lead to at least one neighboring layer-3 switch or router.

In some embodiments of the invention, the bridging unit bridges in layer-2 packets received through a port which leads to at least one other layer-3 switch or router, through other ports which lead to at least one neighboring layer-3 switch or router. In some embodiments, the multicast detector identifies the packets at least responsive to their protocol field. In some embodiments, the group of packets identified by the multicast detector comprises substantially all the IP multicast routing related control packets received by the switch or substantially all the IP multicast routing related packets received by the switch.

In some embodiments the switch includes a layer-3 routing unit which routes at least some IP multicast routing related packets between ports of the same VLAN. In some embodiments, the multicast detector prevents the layer-2 bridging of packets, irrespective of the IP destination address of the packets, of the MAC destination address of the packets and/or of subscription information of hosts directly connected to the switch.

There is further provided in accordance with an embodiment of the present invention, a layer-3 switch, comprising at least one VLAN interface which does not have an associated IP router interface; and a layer-3 output unit which directs IP packets with a MAC source address of the switch through the at least one VLAN interface. In some embodiments, the packets directed through the at least one VLAN interface, by the layer-3 output unit, include EP packets routed by the switch in layer-3 and/or IP packets generated by a higher layer of the switch. In some embodiments, the packets directed through the at least one VLAN interface, by the layer-3 output unit, include packets of a routing protocol and/or IP multicast packets.

Alternatively or additionally, the packets directed through the at least one VLAN interface, by the layer-3 output unit, include IP multicast routing related control packets. In some embodiments, the layer-3 output unit directs packets through the at least one VLAN interface, with an IP source address associated with a different VLAN interface of the switch.

There is further provided in accordance with an embodiment of the present invention, a method of forwarding packets, comprising receiving a packet with a source MAC address and a TTL value, changing the source MAC address of the received packet, and forwarding the packet with the changed MAC address but with the same TTL value.

In some embodiments, receiving the packet comprises receiving an IP multicast data packet. In some embodiments, forwarding the packet comprises forwarding within the same VLAN from which the packet was received.

There is further provided in accordance with an embodiment of the present invention, a switch, comprising a plurality of ports, a layer-3 multicast routing table, which identifies interfaces to which multicast packets should be routed according to both a VLAN and a port, and a multicast routing unit which routes multicast packets between the ports of the switch based on entries of the multicast routing table. In some embodiments, the layer-3 multicast routing table may operate in a first mode in which interfaces are identified by both a VLAN and a port or in a second mode in which interfaces are identified only by a VLAN.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 2:
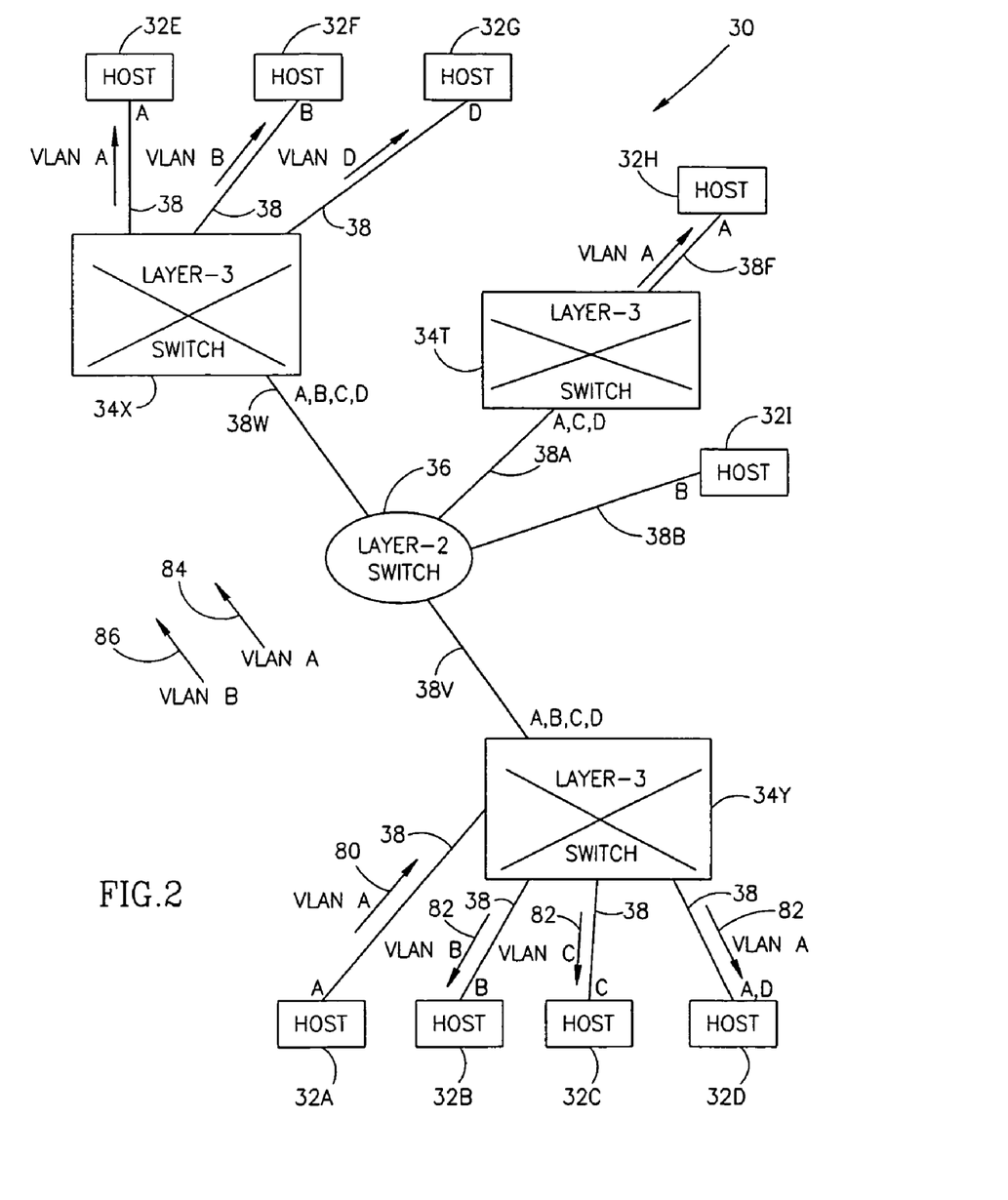
FIG. 2 is a schematic block diagram of a local area network illustrating the distribution of IP multicast packets, in accordance with an embodiment of the present invention.

FIG. 2 is a schematic block diagram of a local area network 30 illustrating the distribution of IP multicast packets, in accordance with an embodiment of the present invention. Network 30 comprises a plurality of hosts 32 (labeled 32A, 32B, 32C, etc.) and layer-3 switches 34 (labeled 34X, 34Y and 34T). Network 30 may also comprise one or more layer-2 switches 36 which do not perform layer-3 routing. Switches 34 and 36 and hosts 32 are connected through links 38. Each link 38 is marked in FIG. 2 with letters (A, B, C and/or D) which designate the VLANs supported by the link.

In some embodiments of the invention, layer-3 switches 34 do not bridge in layer-2 packets related to IF multicast routing protocols, even if the layer-2 addresses of the packets require such bridging. In some embodiments of the invention, the packets related to IP multicast routing protocols (referred to herein as IP multicast routing related packets) include IP multicast data packets and IP multicast routing related control packets. The IP multicast routing related control packets are packets which are used by multicast related protocols, such as IP multicast routing protocols (e.g., PIM-DM, DVMRP, PIM-SM) and multicast subscription protocols (e.g., IGMP).

In some embodiments of the invention, IP multicast data packets are identified, according to their IP multicast destination address which belongs to an IP multicast group identified by switch 34. Alternatively, all packets carrying an IP multicast destination address are considered IP multicast data packets unless the multicast address belongs to a group of special addresses used for other purposes, e.g., 224.0.0.x. In some embodiments of the invention, multicast control packets are identified based on their protocol field, and/or based on fields of their specific protocol, such as specific ports of UDP. Alternatively, only IP multicast related packets with multicast or broadcast MAC addresses are not bridged in layer-2 by layer-3 switches 34, while EP multicast related packets with unicast MAC addresses are bridged as regular non-multicast packets.

In some embodiments of the invention, switches 34 comprise a bridging unit which automatically bridges (in layer-2) unicast layer-2 packets not directed to the receiving switch and packets carrying layer-2 multicast and/or broadcast MAC addresses. In some embodiments of the invention, switches 34 comprise a multicast detector which identifies multicast packets which should not be bridged in layer-2, and prevents the bridging unit from forwarding the identified packets.

Figure 3:
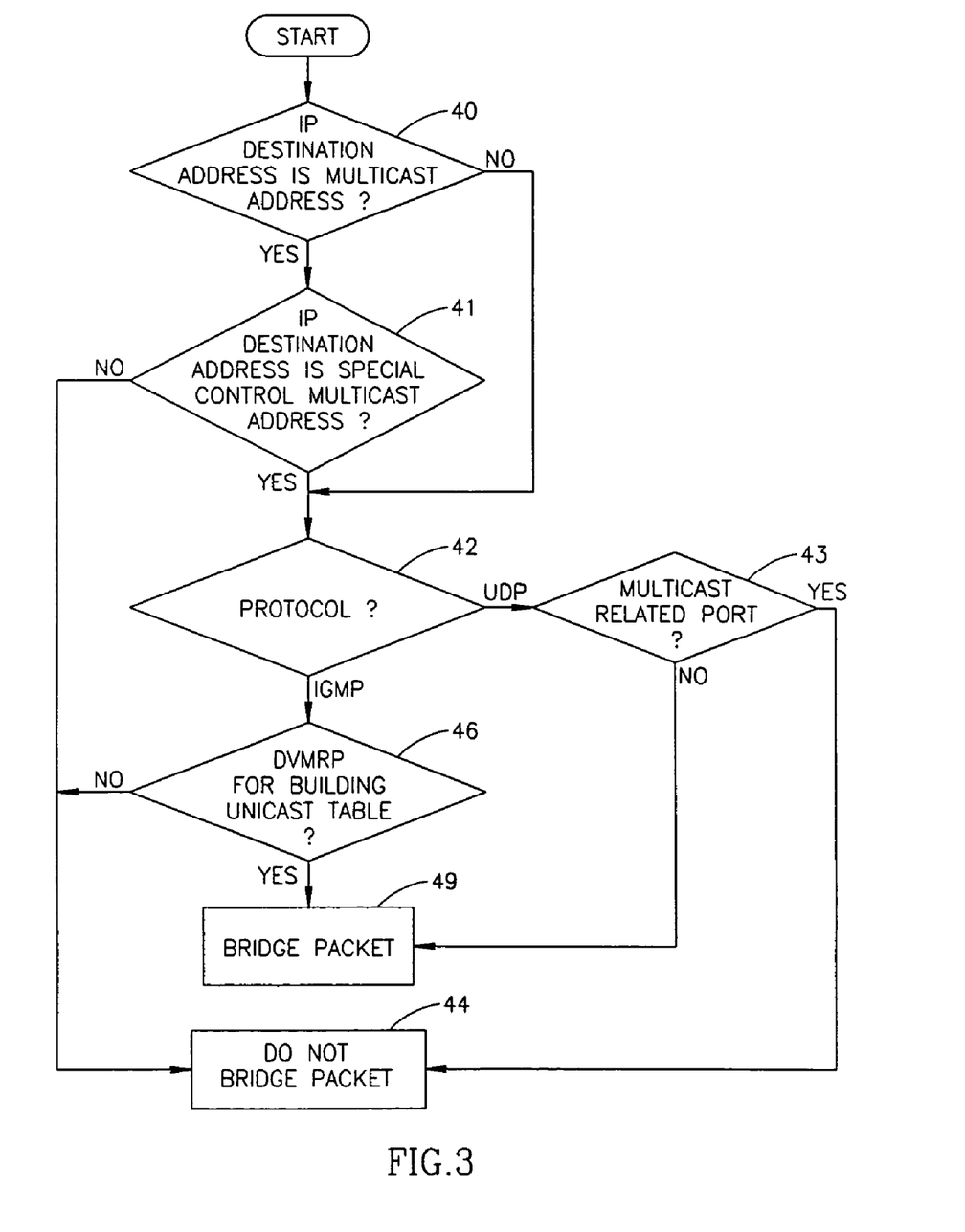
FIG. 3 is a flowchart of the actions performed in determining whether to bridge a packet in layer-2, in accordance with an embodiment of the present invention.

FIG. 3 is a flowchart of the acts of a multicast detector in determining whether a packet is an IP multicast routing related packet, in accordance with an embodiment of the present invention. In some embodiments of the invention, the multicast detector checks (40) whether the destination IP address of the received packet is in the range of IP multicast addresses. If (41) the IP destination address is not in a range of special IP multicast addresses used for control purposes, e.g., 224.0.0.x, the packet in not (44) bridged. Otherwise (41) the multicast detector determines (42) the protocol to which the packet belongs. In addition, if (40) the packet has a unicast address, the multicast detector determines (42) the protocol to which the packet belongs. Alternatively, the multicast detector determines whether the specific EP destination address of the packet relates to a multicast protocol.

If (42) the packet belongs to the IGMP protocol, the multicast detector optionally determines (46) whether the packet is a DVMRP packet for building a unicast routing table. DVMRP packets for building a unicast routing table are bridged (49), while all other IGMP packets are not (44) bridged. If (42) the packet belongs to the UDP protocol, the multicast detector optionally determines whether the port of the packet is a port of a multicast related protocol. Packets directed to multicast related ports are not bridged (44) while all other packets are bridged (49).

It is noted that other multicast routing related packets not referred to in FIG. 3 may be detected based on the packet's IP destination address, protocol field, destination or source port and/or other fields of the packet using similar principles to those described above with reference to FIG. 3.

In some embodiments of the invention, switches 34 comprise a hardware unit and a processor. In some embodiments of the invention, the multicast detector which prevents bridging of IP multicast routing related packets is implemented entirely in hardware or entirely in software. Alternatively, the multicast detector is implemented partially by the hardware unit and partially by a software running on the processor. In some embodiments of the invention, the hardware portion determines for some of the packets received by the switch 34 whether they should be bridged. Other packets are passed to the processor which determines whether they should be bridged. In an embodiment of the invention, packets carrying IP multicast addresses in the range of special IP multicast addresses, and/or which belong to the IGMP protocol or are directed to a multicast control UDP port are transferred to the processor which determines whether they should be bridged. In this embodiment, the remaining packets with destination IP multicast addresses are not bridged and remaining packets which do not have IP multicast addresses are bridged by the hardware unit. It is noted that the hardware unit may be replaced by any other fast forwarding unit.

In the following discussion it is assumed that all the layer-3 switches 34 in network 30 have the same behavior toward IP multicast related packets. Further hereinbelow, cases in which some of the layer-3 switches of a network have a different behavior than other layer-3 switches, will be discussed.

Generally, switch 34 does not route multicast control packets in layer-3 since the multicast control packets are usually transmitted with a TTL of 1 which does not allow routing of packets. Since network topology for multicast purposes is determined based on the propagation of multicast control packets, at least some of the VLANs of network 30 are partitioned to a plurality of VLAN segments which operate as separate sub-networks for IP multicast purposes. In these embodiments, each network segment formed of links and layer-2 switches 36, which connects two or more layer-3 switches 34 and/or hosts 32 is considered a separate VLAN segment, for each of the VLANs supported by the network segment. It is noted that VLANs on separate physical LANs are considered separate VLANs even if they carry the same VLAN ID.

In network 30, three separate segments connect hosts 32E, 32F and 32G, respectively, to layer-3 switch 34X. Four VLAN segments connect layer-3 switches 34X and 34Y. These four segments include VLAN segments for VLANs C and D which include the two links 38W and 38V which connect switches 34X and 34Y, respectively, to layer-2 switch 36. For VLANs A, C and D these segments include in addition to links 38W and 38V, link 38A which connects layer-2 switch 36 to switch 34T. In VLAN B, the VLAN segment between switches 34X and 34Y includes links 38V, 38W and link 38B. The link between switch 34Y and host 32D includes two VLAN segments for VLANs A and D, respectively. The links leading to hosts 32A, 32B and 32C each include a single VLAN segment. An additional VLAN segment includes link 38F which connects switch 34T to host 32H.

In some embodiments of the invention, each layer-3 switch 34 participates in a separate IGMP session for each of the VLAN segments to which the switch 34 is directly connected. That is, for each of the VLAN segments to which switch 34 is connected, if IGMP query packets having a lower source IP address are not received on the VLAN segment, the switch transmits IGMP query packets on that VLAN segment. Similarly, in some embodiments, the switch performs the multicast routing protocol of the switch separately on each of the VLAN segments to which the switch is connected. Specifically, the switch makes sure that hello packets and/or other control packets of the multicast routing protocol used by the switch are transmitted separately and independently on each of the VLAN segments to which the switch is connected. It is noted, however, that the user may define VLAN segments which are not to participate in the multicast routing protocol and/or in the IGMP protocol.

For each multicast group (identified by an IP multicast address) or source group (identified by both the IP destination address and the IP source address), switches 34 list the VLAN segments directly connected to the switch 34 which include subscribers of the multicast group or source group. In addition, switches 34 list for each multicast or source group, the VLAN segments which should receive the multicast packets of the group according to the multicast routing protocol they use. In some embodiments of the invention, these listings, optionally together with information from the unicast routing table of the switch, are used to create a multicast routing table which states for each multicast group or source group the interfaces through which the packets are to be forwarded and optionally a legal interface of the group, as is known in the art. Generally, multicast packets received through the legal interface of their source group, are routed by the switch, while multicast packets received through other interfaces are not routed by the switch. In some embodiments of the invention, the legal interface of the multicast packet is the VLAN segment through which a unicast packet would be transmitted from switch 34 to the source of the multicast packet (identified from the source IP address of the packet).

In some embodiments of the invention, the multicast routing table is created and managed in a manner similar to that known in the art. However, the multicast routing table created in accordance with the above described embodiments of the present invention identifies interfaces as VLAN segments (i.e., pairs of VLANs and physical ports), while the prior art multicast routing tables identify interfaces as VLANs. Therefore, generally, multicast routing tables of the prior art include fewer entries than included in multicast routing tables created in accordance with the present invention. In these embodiments, multicast data packets are always routed to subscriber hosts 32 by a layer-3 switch connected to a VLAN segment to which the subscriber hosts 32 are connected.

In some embodiments of the invention, the multicast routing table is implemented in software. Alternatively or additionally, the multicast routing table is implemented in hardwire to allow faster multicast routing. In some embodiments of the invention, a system manager may determine for switches 34 whether they relate in their multicast routing table to each VLAN or to each VLAN segment.

Figure 4:
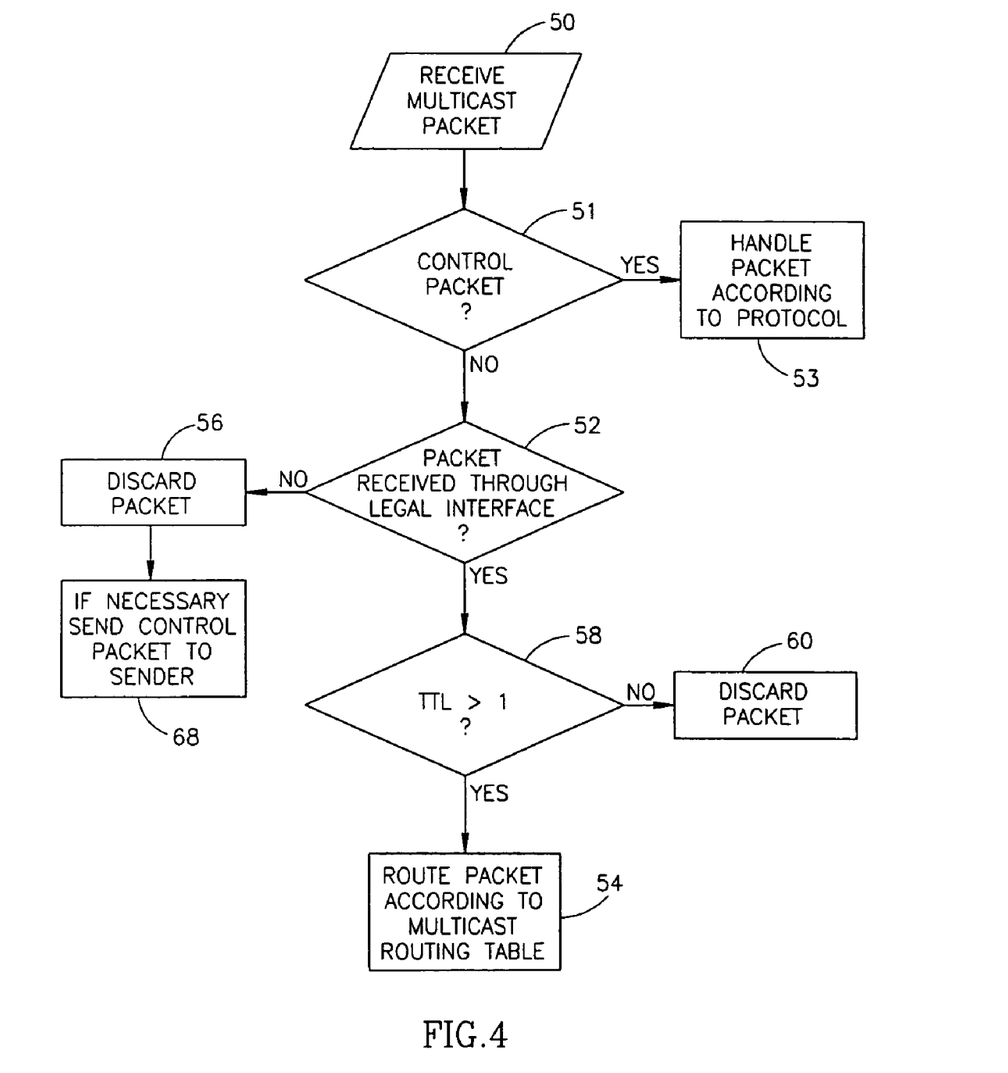
FIG. 4 is a flowchart of the actions performed by a layer-3 switch upon receiving a multicast packet, in accordance with an embodiment of the present invention.

FIG. 4 is a flowchart of the actions performed by a layer-3 switch 34 operating in receiving a multicast packet, in accordance with an embodiment of the present invention. In the embodiment of FIG. 4, switches 34 operate in accordance with the PIM-DM multicast routing protocols. Some modifications required for operation with other multicast routing protocols are described hereinbelow. Modifications required for operation with some other multicast routing protocols may be devised according to the same principles by those skilled in the art in view of the present application. Upon receiving (50) an IP multicast routing-related packet, switch 34 determines (51) whether the packet is a control packet. If the packet is a control packet, the packet is handled (53) by the switch in accordance with the protocol of the packet. As control packets have a TTL of 1 they are not routed by the switch through any of the ports. If (51) the packet is not a control packet, switch 34 determines (52) whether the packet was received from the legal interface of the packet, i.e., from the VLAN segment which leads to the source of the packet.

If (52) the packet was received through a VLAN segment other than the legal interface of the source group, the packet is discarded (56), as each VLAN segment connects to switch 34 only through a single physical port and no layer-2 bridging of multicast packets is required. Optionally, if the switch 34 does not want to receive additional multicast packets of the same source group through the VLAN segment through which the packet was received, switch 34 sends (68) a control multicast packet to the sending router or switch, requesting not to send additional packets, in accordance with the PIM-DM protocol.

If (52), however, the packet was received through the legal interface, switch 34 determines (58) the TTL value of the packet. If the packet has a TTL value of 1, the packet is discarded (60). If the packet has a TTL value greater than 1, the packet is routed (54) through the interfaces (VLAN segments) listed in the multicast routing table as interfaces which should receive packets belonging to the source group of the packet.

In some embodiments of the invention, the method of FIG. 4 is carried out with reference to the multicast routing table of switch 34. If there is no entry for a received packet in the table, an entry is created for the source group of the received packet before or during the carrying out of the method of FIG. 4.

In some embodiments of the invention, switches 34 have a separate MAC address for each VLAN to which they are connected, in accordance with the practice known in the art. Alternatively, switches 34 have a separate MAC address for each VLAN segment to which they are connected.

It is noted that in some embodiments of the invention, multicast packets may undergo a plurality of routing operations within a single LAN, contrary to the prior art in which the packet is routed only once. It is noted that in the embodiments described hereinbelow with reference to FIG. 5, multicast packets may be routed within a single LAN up to twice. In some embodiments of the invention, the TTL field of multicast packets entering a network are incremented by a predetermined amount in order to compensate for the additional routing operations which the packet will undergo within the network. Optionally, the incrementing is performed only upon entrance to a dead end network which has only a single entrance router, so that it is not possible that a packet will eternally be routed through a loop including the incrementing router.

Alternatively, IP multicast packets which are to be routed within the same VLAN are routed without reducing the TTL. Further alternatively, multicast packets which according to the multicast routing table should be routed within a single VLAN, are bridged in layer-2. It is noted that the danger of damage being caused by packets eternally being routed through the network is relatively low as the multicast routing protocols prevent transmission of multicast packets not along their distribution tree, which generally does not include loops.

Referring back to FIG. 2, if host 32A is a source of a multicast group and the remaining hosts 32 are subscribers of the multicast group, the packets are transmitted from source host 32A to switch 34Y on VLAN A, as indicated by an arrow 80. Switch 34Y performs layer 3 routing of the packets and passes them to hosts 32B, 32C and 32D, as indicated by arrows 82. In addition, during a flooding stage of the PIM-DM protocol, switch 34Y passes the routed packets on to link 38V in four copies: in each of the VLANs supported by link 38V. In some embodiments of the invention, the routing includes decrementing the TTL of the routed packets. Switch 34X and/or 34T responds with control packets requesting not to send copies on one or more of the VLANs, optionally VLANs C and D (which do not include subscribers), such that further multicast packets of the same source group are sent only in two copies, in VLAN A (84) and VLAN B (86).

The packets are bridged by layer-2 switch 36 to switch 34T and host 32I on VLANs A and B, respectively. The packets reaching layer-3 switch 34T are routed to host 32H. In addition, both copies of the packets are bridged by layer-2 switch 36 to link 38W and reach layer-3 switch 34X. One of the copies, without loss of generality the copy on VLAN A, reaches switch 34X through a non-legal interface (each switch has only a single legal interface) and is therefore discarded. The other copy (on VLAN B) reaches layer-3 switch 34X through its legal interface and is therefore routed by switch 34X to hosts 32E, 32F and 32G. In some embodiments of the invention, in the routing of switch 34X, the value in the TTL field of the packet is again decremented. It is noted that the copy received on VLAN B is not bridged in layer-2 by switch 34X to host 32F although host 32F is connected through VLAN B to switch 34X, since switches 34 do not bridge multicast packets in layer-2.

Using normal TTL behavior, packets leaving source host 32A with a TTL value of 3 or above, will reach all the hosts shown in FIG. 2. Packets leaving source host 32A with a TTL value of 2, will reach hosts 32B, 32C, 32D and 321 and switches 34X and 34T but switches 34X and 34T will not forward the packet as the packet is received by switches 34X and 34T with a TTL of 1. Packets leaving source host 32A with a TTL value of 1, will only reach switch 34Y and will not be forwarded to any of hosts 32. This allows partial distribution of multicast packets within a VLAN, when so desired.

In some embodiments of the invention, the VLAN segments sharing a link (or links) which connect at least three layer-3 switches (or routers), e.g., the VLAN segment including links 38V, 38W and 38A, are given different weights in the unicast routing protocols of the switches. Thus, in receiving multicast packets of a specific source group, all the layer-3 switches will choose the same VLAN (the VLAN providing the shortest path to the source of the packets of the source group), on which to receive multicast packets of the source group. Thus, the number of copies of multicast packets passed on the VLAN segment may be reduced. For example, if VLAN A on links 38V, 38W and 38A is given a lower weight than VLANs B, C and D on these links, both of switches 34X and 34T will choose to receive IP multicast packets from switch 34Y on VLAN A. This prevents switch 34X from choosing to receive IP multicast packets on one of the VLANs while switch 34T chooses to receive multicast packets on a different VLAN.

In some cases, a switch 34 has a physical port which is used only for layer-2 bridging and therefore does not have an associated IP address. In some embodiments of the invention, in transmitting multicast control packets through physical ports without an IP address, an IP address associated with a different physical port of the switch is used as a source IP address of the control packets. For example, the lowest or highest IP address of the switch may be used. Alternatively, the loop back interface of the switch may be configured with a regular IP address, i.e., not the 127.0.0.1 address, and the configured address is used by the switch for packets transmitted through the physical ports which do not have associated interfaces. Further alternatively, any other address which will not confuse the receiving switches or hosts may be used.

In some embodiments of the invention, the method is backward compatible, i.e., network 30 may include legacy layer-3 switches which operate according to prior art multicast schemes or which do not support IP multicast. Such legacy layer-3 switches bridge multicast packets in layer-2. Therefore, in dividing the network into VLAN segments, the prior art layer-3 switches will be treated in a manner similar to the treatment of layer-2 switches. In substantially all other respects, the prior art layer-3 switches will cooperate with the layer-3 switches of the invention and no adaptations are needed. Particularly, it is noted that the legacy layer-3 switches may route IP multicast packets in layer-3 if the protocol they run requires such routing.

In some embodiments of the invention, layer-3 switches 34 do not perform layer-2 multicast filtering, as they do not forward multicast packets using only layer-2 bridging.

In some of the embodiments of the invention in which the PIM-SM multicast routing protocol is used, when a first layer-3 switch 34 receives a JOIN message directed to a different switch or router, the layer-3 switch 34 acts as if the JOIN message was directed to itself. That is, the receiving layer-3 switch adds the interface from which the JOIN message was received to a multicast tree of the group to which the JOIN message pertains and sends a JOIN message from it (the first layer-3 switch) to the destination of the original JOIN message. Thus, when a JOIN message is sent to a destination switch which is not connected to the same VLAN segment as the source switch (although the source and destination are connected by the same VLAN) the joining procedure is performed correctly, such that the spanning tree includes layer-3 switches connected by VLAN segments.

In some of the embodiments of the invention in which the PIM-SM multicast routing protocol is used, when a layer-3 switch receives an IP multicast packet along a VLAN to which both the receiving switch and the source of the packet are connected, the packet is forwarded, in the same VLAN, to all the routers and/or layer-3 switches to which the receiving layer-3 switch is directly connected in that same VLAN. This forwarding may be performed in layer-2 or layer-3. In some embodiments of the invention, layer-3 switches identify such packets by determining the sub-net of the IP source address of the packet. If the sub-net is configured as directly connected to the switch and the VLAN of the sub-net is the VLAN of the packet, the packet is forwarded to the neighboring routers and/or layer-3 switches of the VLAN.

Alternatively or additionally, a layer-3 switch which receives a JOIN message relating to a source which is within the same VLAN as the receiving switch, sends a JOIN message to the source. Layer-3 switches which receive the JOIN message will intercept the message and operate as described above. It is assumed that the source will ignore the JOIN message.

Thus, the present invention operates also with the PIM-SM multicast routing protocol although in the prior art the layer-3 switch servicing the source does not necessarily have to be in the same VLAN segment as the source.

In some embodiments of the invention, networks are divided into fewer VLAN segments than described above. This involves layer-2 bridging of multicast packets through one or more layer-3 switches. For example, all the hosts directly connected (i.e., connected without intervening layer-3 switches operating in accordance with the present invention) to a layer-3 switch in a single VLAN may be considered as belonging to a single VLAN segment. Thus, multicast packets originating from one of the directly connected hosts are bridged in layer-2 to directly connected subscriber hosts. The layer-3 switch may or may not perform multicast filtering.

In some embodiments of the invention, in each VLAN, a backbone VLAN segment is formed of all the VLAN segments which connect two or more multicast routers and/or layer-3 switches. Thus, the backbone VLAN segment in each VLAN connects all the layer-3 switches and routers to each other and provides layer-2 connectivity of the layer-3 switches of VLANs. This connectivity is assumed by some of the multicast routing protocols and is required for the correct operation of these protocols, if the protocols are to be used without alterations. For the purposes of substantially all multicast routing protocols, the backbone VLAN segment is sufficient to allow the protocols to operate correctly without adaptations.

Figure 5:
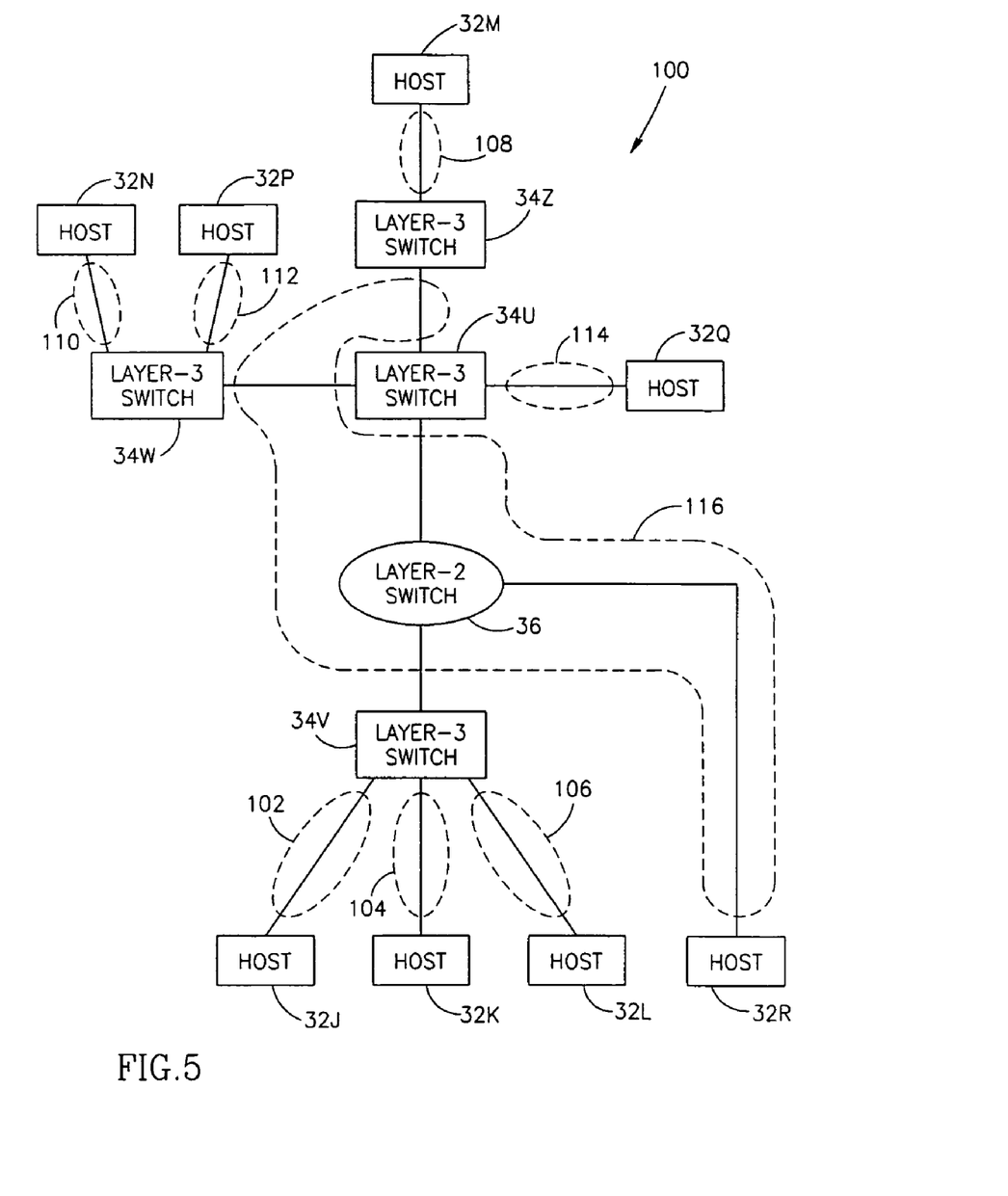
FIG. 5 is a schematic block diagram of a local area network illustrating the distribution of IP multicast packets, in accordance with another embodiment of the present invention.

FIG. 5 is a schematic block diagram of a local area network 100 illustrating the distribution of IP multicast packets, in accordance with an embodiment of the present invention. Assuming network 100 supports a single VLAN, network 100 includes eight VLAN segments. Three segments 102, 104 and 106 connect switch 34V to hosts 32J, 32K and 32L, respectively. Two additional segments 110 and 112 connect hosts 32N and 32P to switch 34W, a segment 108 connects host 32M to switch 34Z and an additional segment 114 connects host 32Q to switch 34U. A backbone segment 116 connects switches 34V, 34W, 34Z and 34U. It is noted that switch 34U includes a plurality of physical ports which lead to the backbone segment, and therefore switch 34U bridges, in layer-2, IP multicast packets, within backbone segment 116. As host 32R is connected through a layer-2 switch 36 situated between layer-3 switches 34U and 34V it is connected through backbone segment 116.

Assuming host 32J is a source of a multicast group and the rest of the hosts 32 are subscribers, the multicast packets from host 32J are routed by switch 34V to segments 104, 106 and to backbone segment 116. Switch 34U receives the routed packet from switch 34V and bridges it in layer-2 to switches 34Z and 34W. In addition, switch 34U routes the packets in layer-3 to host 32Q. Switches 34Z and 34W route the packets to their respective hosts 32M, 32N and 32P. A packet sent from host 32J with TTL=2 will reach switch 34V with TTL=2 and switches 34U, 34W and 34Z, with TTL=1. Therefore, the packet will not reach hosts 32M, 32N, 32P and 32Q. The packet does reach host 32R since the packets are bridged to host 32R in layer-2 by switch 36 which does not relate to the TTL value.

In some embodiments of the invention, the above segmentation of network 100 is achieved by having switches 34 bridge (in layer-2) some of the multicast related packets they receive without bridging others of the multicast related packets they receive. In an embodiment of the invention, switches 34 bridge multicast related packets received through a port which leads to one or more router or layer-3 switch to all other ports of the same VLAN which lead to one or more router or layer-3 switch.

In some embodiments of the invention, layer-3 switches 34 keep track for each of their ports whether a router and/or layer-3 switch (which supports IP multicast, either new or legacy) is connected in layer-2 to the switch through the port. In some embodiments of the invention, the determination is performed periodically, optionally, using standard methods of the multicast routing protocol of the switches 34. Alternatively or additionally, other packets transmitted through the ports, which carry information on whether a layer-3 switch or router is directly connected to the port, are used by the switch in performing the determination.

Figure 6:
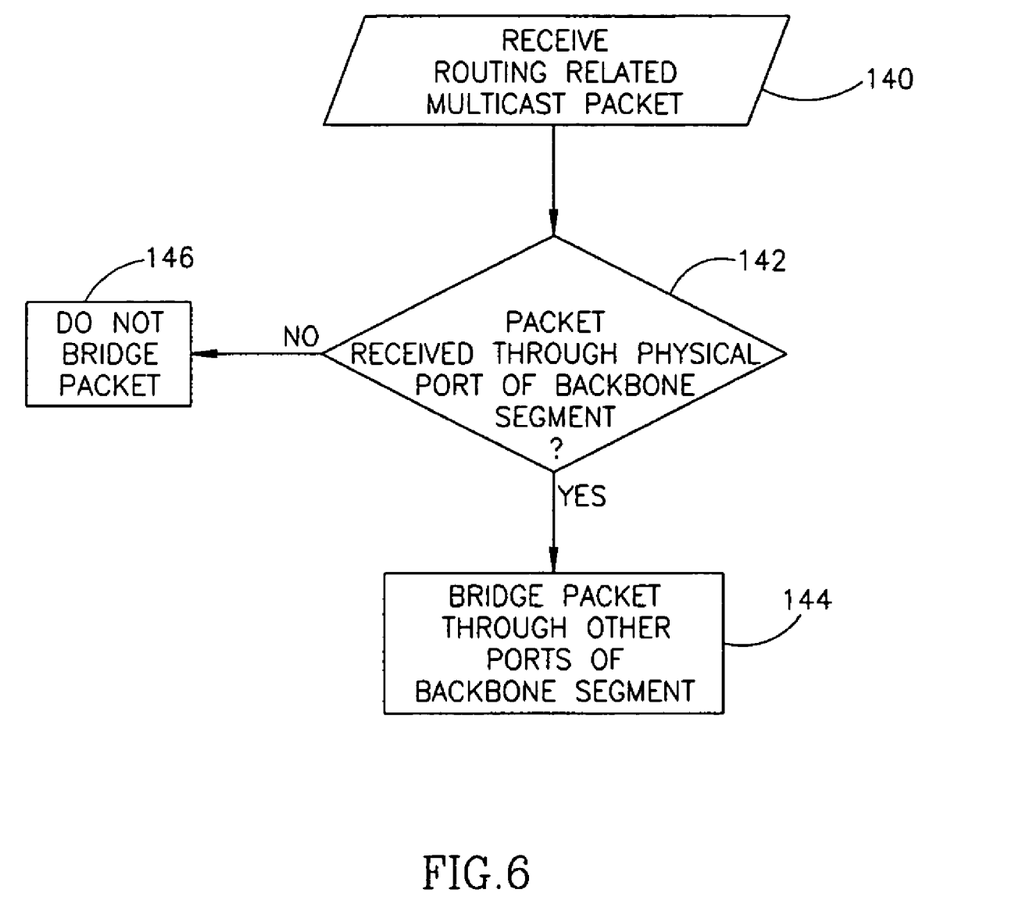
FIG. 6 is a flowchart of the actions performed by a layer-3 switch upon receiving a multicast routing related packet, in accordance with an embodiment of the present invention.

FIG. 6 is a flowchart of the acts performed by a layer-3 switch upon receiving a multicast routing related packet (140), in accordance with an embodiment of the present invention. Generally, the multicast routing related packet is received with a TTL of 1 and therefore is not routed in layer-3 by the switch. If (142) the multicast routing related packet was received through a physical port belonging to a backbone segment, the packet is bridged (144) in layer-2 through the other physical ports belonging to the same backbone segment. If the multicast routing related packet was received through a physical port leading to a VLAN segment which is not a backbone segment, the packet is not bridged in layer-2 (146) through any other physical port of the switch.

In some embodiments of the invention in which LANs include a backbone segment, layer-3 switches 34 perform layer-3 routing of multicast packets according to the standard, known in the art, behavior of a multicast routing protocol. As described above, some embodiments of the present invention differ from the prior art in the number of entries in their routing and subscription lists.

The embodiments which have a backbone segment operate independently of the multicast routing protocol used and do not require any changes in the routing protocols. The existence of the backbone segment in each VLAN eliminates connectivity problems which required routing protocol modifications in the switches which implement the embodiments described above with respect to FIGS. 2 and 4.

In some embodiments of the invention, layer-2 switches are given limited routing capabilities which allow them to perform IP multicast routing in accordance with some embodiments of the invention. In some embodiments, these layer-2 switches do not include layer-2 multicast filtering capabilities.

It is noted that although the present invention has been described in relation to the TCP/IP protocol suite, some embodiments of the invention may be implemented with relation to other packet based transmission protocols, such as, for example IPX, DECNET and the ISO protocols. Furthermore, although the above embodiments relate to the Ethernet link layer, some embodiments of the present invention may be used with other layer-2 protocols, such as Frame relay, point to point modem, ISDN, ASDL and ATM. Furthermore, although the term local area network (LAN) was used hereinabove in describing some embodiments of the invention, the present invention may be implemented with substantially any other type of layer-2 network, including layer-2 MANs and WANs.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of determining local multicast information of a local area network (LAN), comprising:
dividing the LAN to a number of segments larger than the number of virtual LANs (VLANs) in the network; and creating a layer-3 multicast routing table, which relates to each of the segments separately wherein dividing the LAN to a plurality of segments comprises dividing such that, for each VLAN, a backbone segment is defined as including all the groups of one or more links which connect two or more routers or layer-3 switches in the VLAN; and wherein the links not included in the backbone segment for each VLAN are divided to separate segments in each VLAN, each segment including a group of one or more links which connect one or more hosts to a router or layer-3 switch.

2. A method of forwarding multicast packets by a layer-3 switch, comprising:

receiving a multicast packet by the switch through a first physical port on a first VLAN; and routing the multicast packet in layer-3 out a second physical port of the switch, on the first VLAN;

wherein the multicast packet is bridged in layer-2 through a third physical port of the layer-3 switch.

3. A method according to claim 2, wherein routing the multicast packet comprises reducing the time to live (TTL) value of the packet.

4. A method according to claim 2, wherein the second physical port leads to at least one layer-3 switch or router.

5. A method according to claim 2, wherein the multicast packet is not bridged in layer-2 through the second physical port.

6. A method of forwarding packets, comprising:

receiving a packet with a source MAC address and a TTL value;

changing the source MAC address of the received packet; and forwarding the packet with the changed MAC address but with the same TTL value.

7. A method according to claim 6, wherein receiving the packet comprises receiving an IP multicast data packet.

8. A method according to claim 6, wherein forwarding the packet comprises forwarding within the same VLAN from which the packet was received.

* * * * *